US006181835B1

United States Patent
Hamill

(10) Patent No.: US 6,181,835 B1
(45) Date of Patent: *Jan. 30, 2001

(54) NON-INTEGER SCALING OF RASTER IMAGES WITH IMAGE QUALITY ENHANCEMENT USING AN ANAMORPHICALLY SCALED INTERMEDIATE BITMAP

(75) Inventor: Carroll Francis Hamill, Boulder, CO (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/998,470

(22) Filed: Dec. 26, 1997

(51) Int. Cl.[7] ........................................... G06K 9/32
(52) U.S. Cl. ................................. 382/299; 358/447
(58) Field of Search ......................... 382/298, 299, 382/254, 301, 303, 308, 268, 269, 300; 358/447

(56) References Cited

U.S. PATENT DOCUMENTS

| | | | |
|---|---|---|---|
| 4,437,122 | | 3/1984 | Walsh et al. ........................ 358/166 |
| 4,569,081 | | 2/1986 | Mintzer et al. ...................... 382/47 |
| 4,712,140 | | 12/1987 | Mintzer et al. .................... 358/260 |
| 5,258,854 | * | 11/1993 | Eschbach .......................... 358/445 |
| 5,263,136 | * | 11/1993 | Deaguiar et al. .................. 395/164 |
| 5,270,836 | * | 12/1993 | Kang ................................. 358/459 |
| 5,387,985 | | 2/1995 | Loce et al. ........................ 358/447 |
| 5,404,411 | * | 4/1995 | Banton et al. ....................... 382/54 |
| 5,467,410 | * | 11/1995 | Bloomberg .......................... 382/100 |
| 5,509,115 | * | 4/1996 | Butterfield et al. .................. 395/147 |
| 5,526,468 | * | 6/1996 | Kolb et al. .......................... 375/102 |
| 5,539,866 | | 7/1996 | Banton et al. ....................... 395/117 |
| 5,579,445 | * | 11/1996 | Loce et al. ......................... 395/102 |
| 5,634,088 | * | 5/1997 | Banton .............................. 395/102 |
| 5,724,455 | * | 3/1998 | Eschbach ........................... 382/260 |
| 5,815,605 | * | 9/1998 | Koike ................................ 382/269 |
| 5,867,612 | * | 2/1999 | Robson ............................. 382/298 |
| 5,870,535 | * | 2/1999 | Duffin et al. ....................... 395/115 |
| 5,920,646 | * | 7/1999 | Kamon .............................. 382/173 |

* cited by examiner

Primary Examiner—Bhavesh Mehta
Assistant Examiner—Kanji Patel
(74) Attorney, Agent, or Firm—Michael J. Buchenhorner; Stephen C. Bongini; Fleit, Kain, Gibbons, Gutman & Bongini P.L.

(57) ABSTRACT

A method for scaling an input bitmap by a non-integer factor with improved image quality comprises the steps of: selecting a pel in the input bitmap; selecting a neighborhood surrounding the selected pel; searching a set of image feature patterns to find an image feature pattern that matches the selected neighborhood; and writing a blocks of bits to an anamorphically scaled intermediate bitmap based on the match. The intermediate bitmap has a resolution in a first direction (row or horizontal direction) which is greater than that of the desired output resolution and has resolution in a second direction (column or vertical direction) which is equal to that of the desired output. The appropriate block of bits is obtained by subsampling an image enhancing tile which corresponds to the matched image feature pattern. The process of matching neighborhoods and writing a subsampled image enhancing tile (i.e., block of bits) to the intermediate bitmap is repeated for each pel in the input bitmap. When the image enhancing tiles are subsampled to the proper size and shape and placed in the proper locations in the intermediate bitmap, the jagged "stair-step" look of curved and diagonal image features in the input image is smoothed, resulting in improved quality. The intermediate rows of the bitmap are then scaled down to a selected output resolution and written into an output bitmap with improved image quality and resolution greater than that of the input bitmap. This method is particularly useful for scaling raster font characters from a given input resolution to the resolution required by an output device when the resolution of the output device is a non-integer multiple of the input resolution.

21 Claims, 11 Drawing Sheets

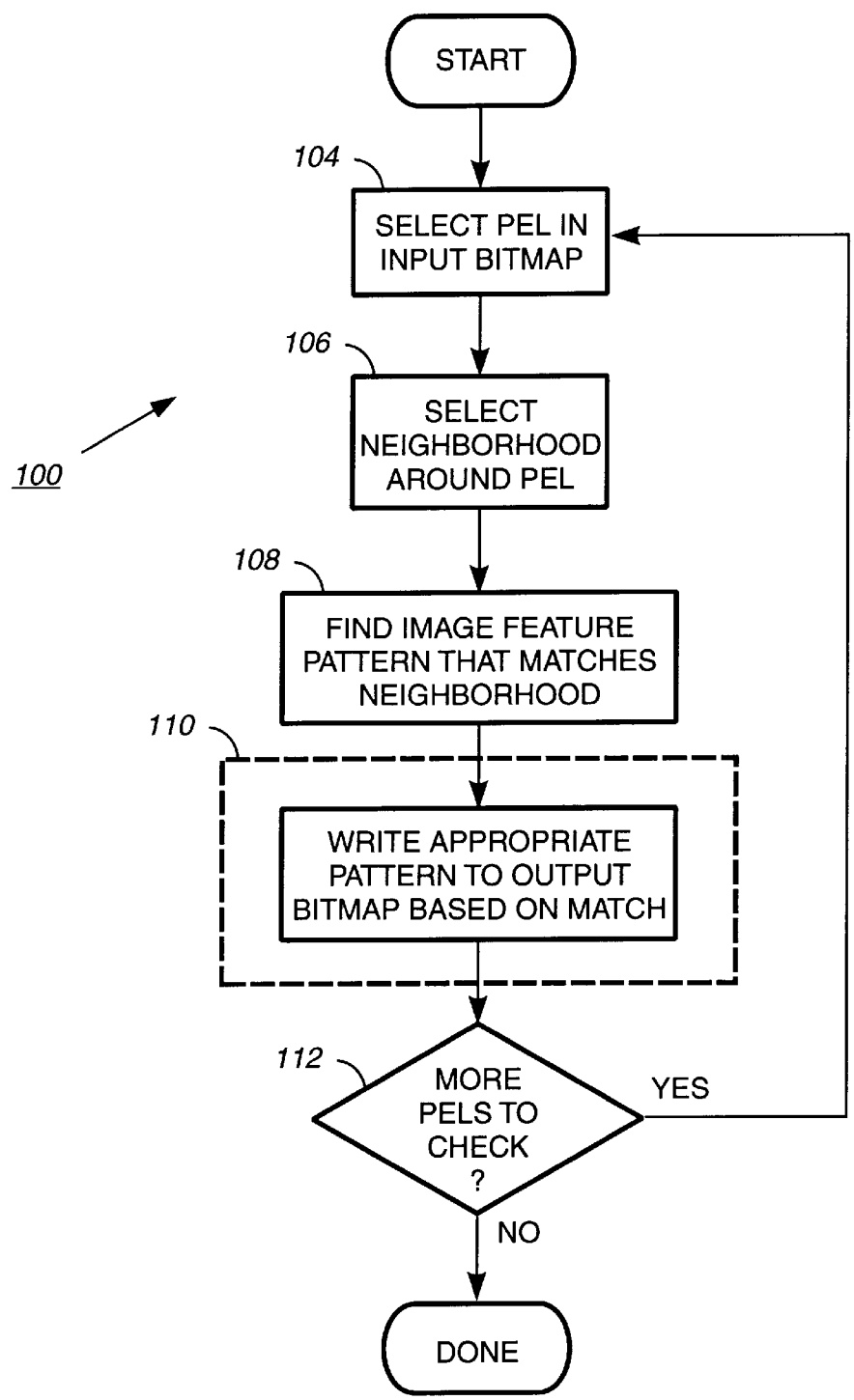
FIGURE 2. SPATIAL ENHANCEMENT METHOD WITHOUT INTERMEDIATE BITMAP

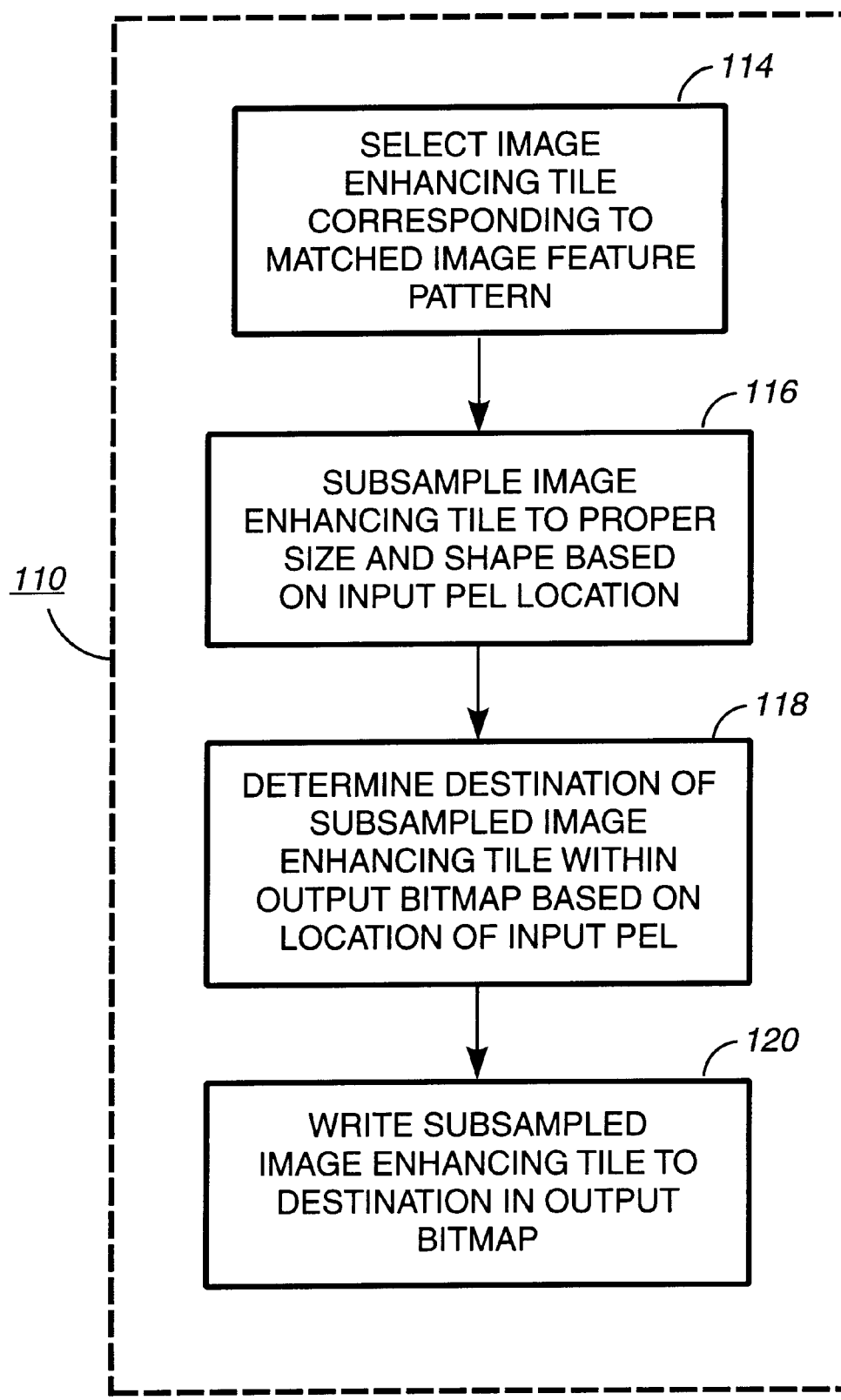
FIGURE 3. DETAIL OF FIG 2.

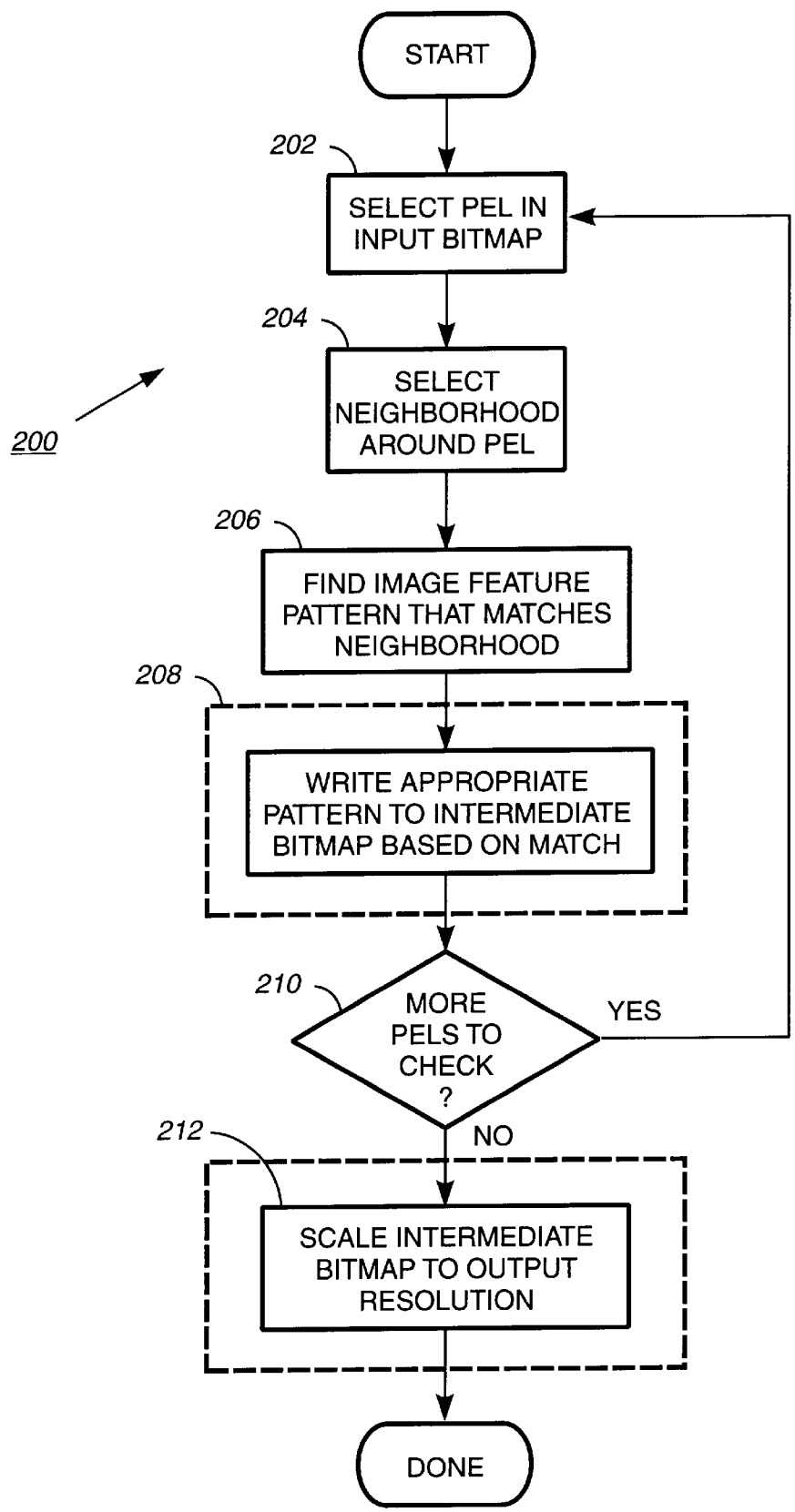
FIGURE 4. SPATIAL ENHANCEMENT WITH INTERMEDIATE BITMAP

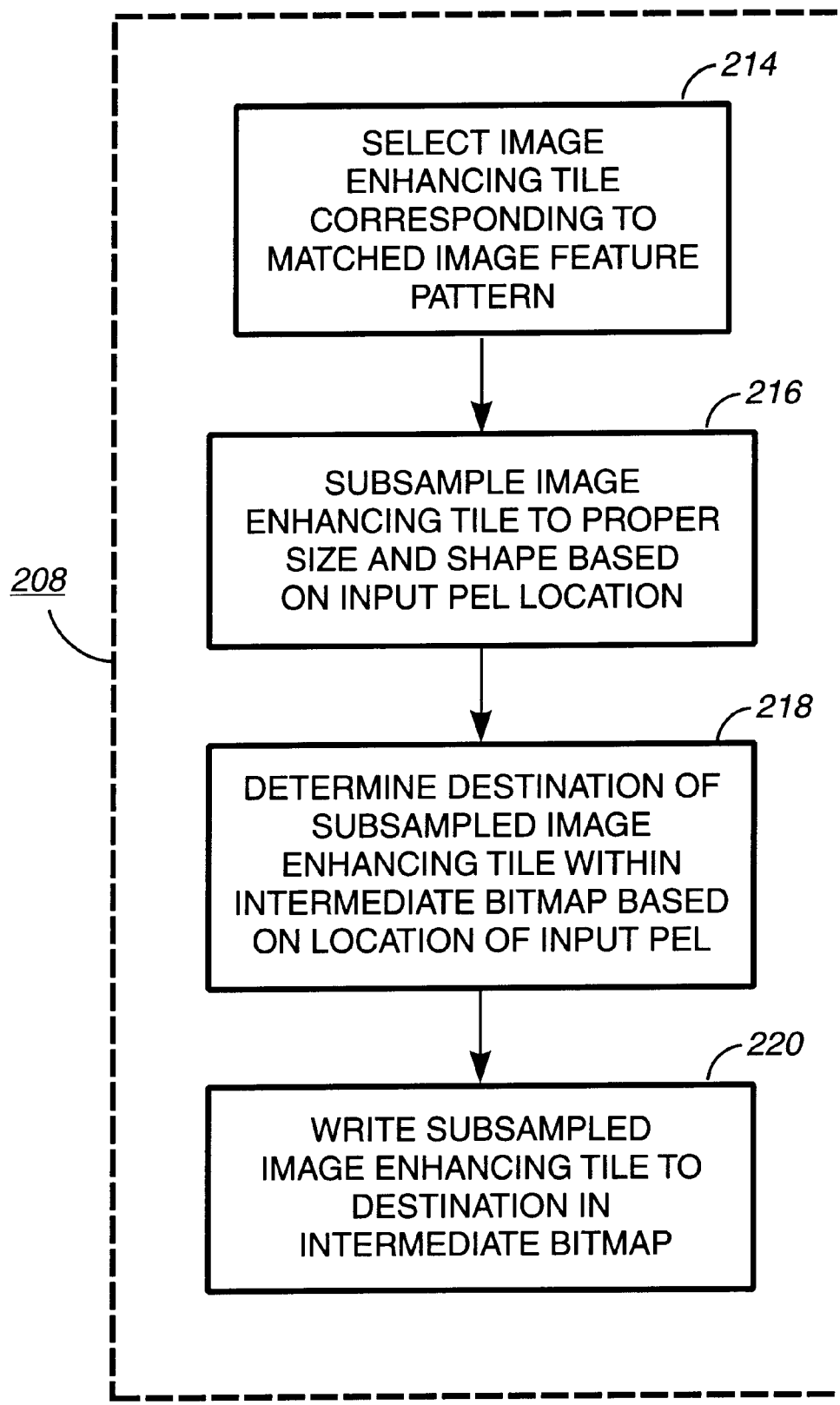
FIGURE 5. DETAIL OF FIG 4.

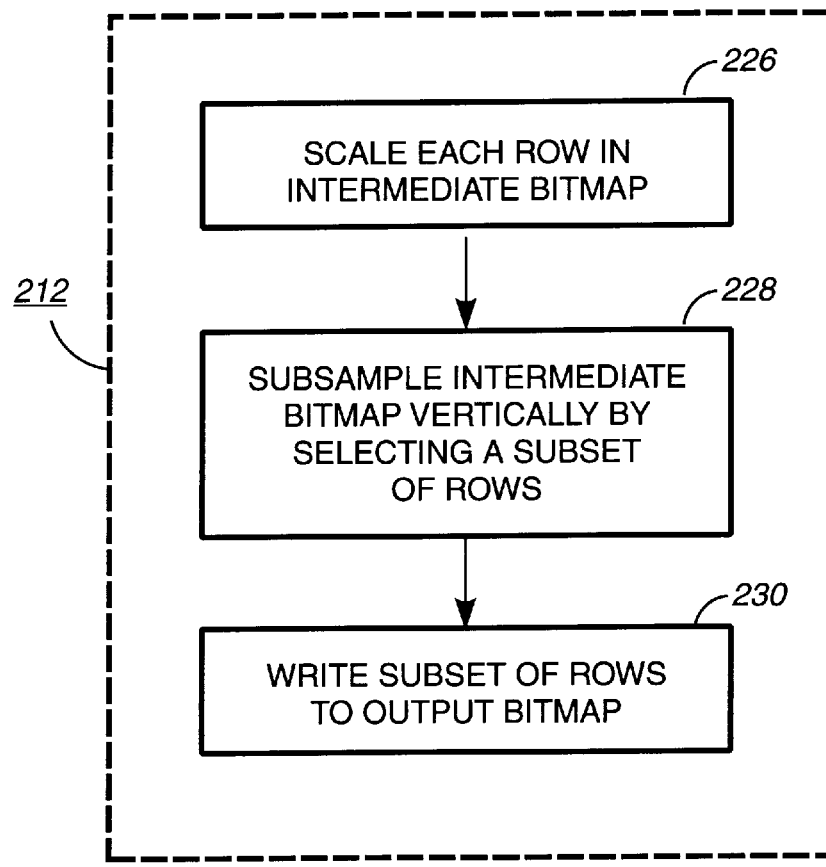
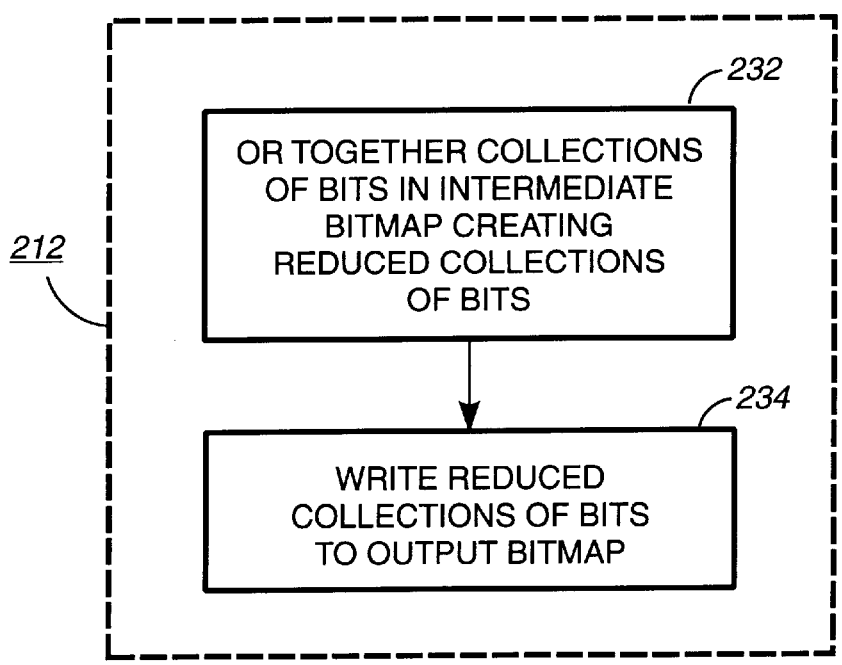
FIGURE 6. DETAIL OF FIG 4.

A
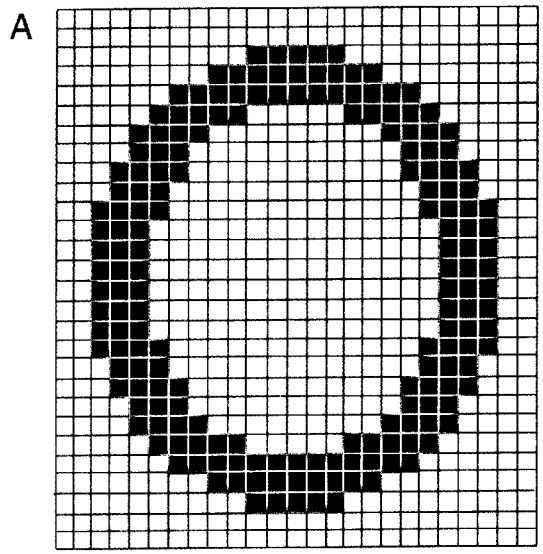
INPUT BITMAP
B
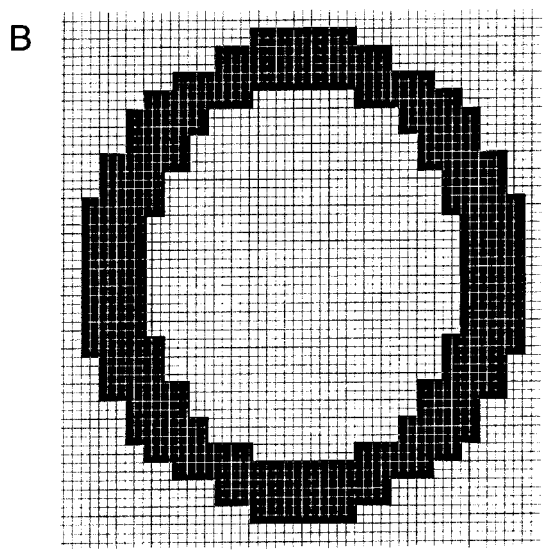
UNENHANCED SCALING
C
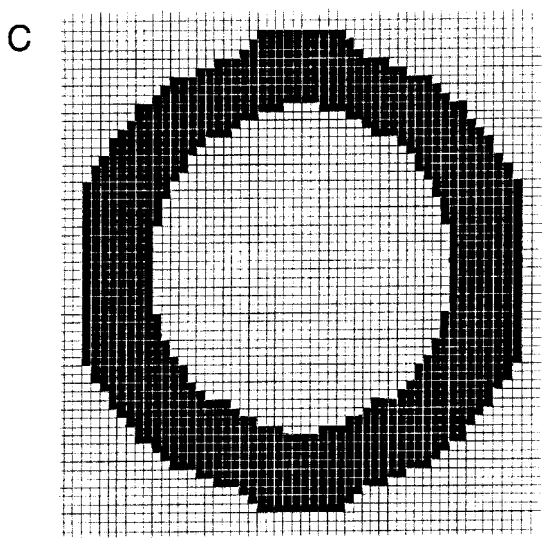
ENHANCED SCALING
FIGURE 8

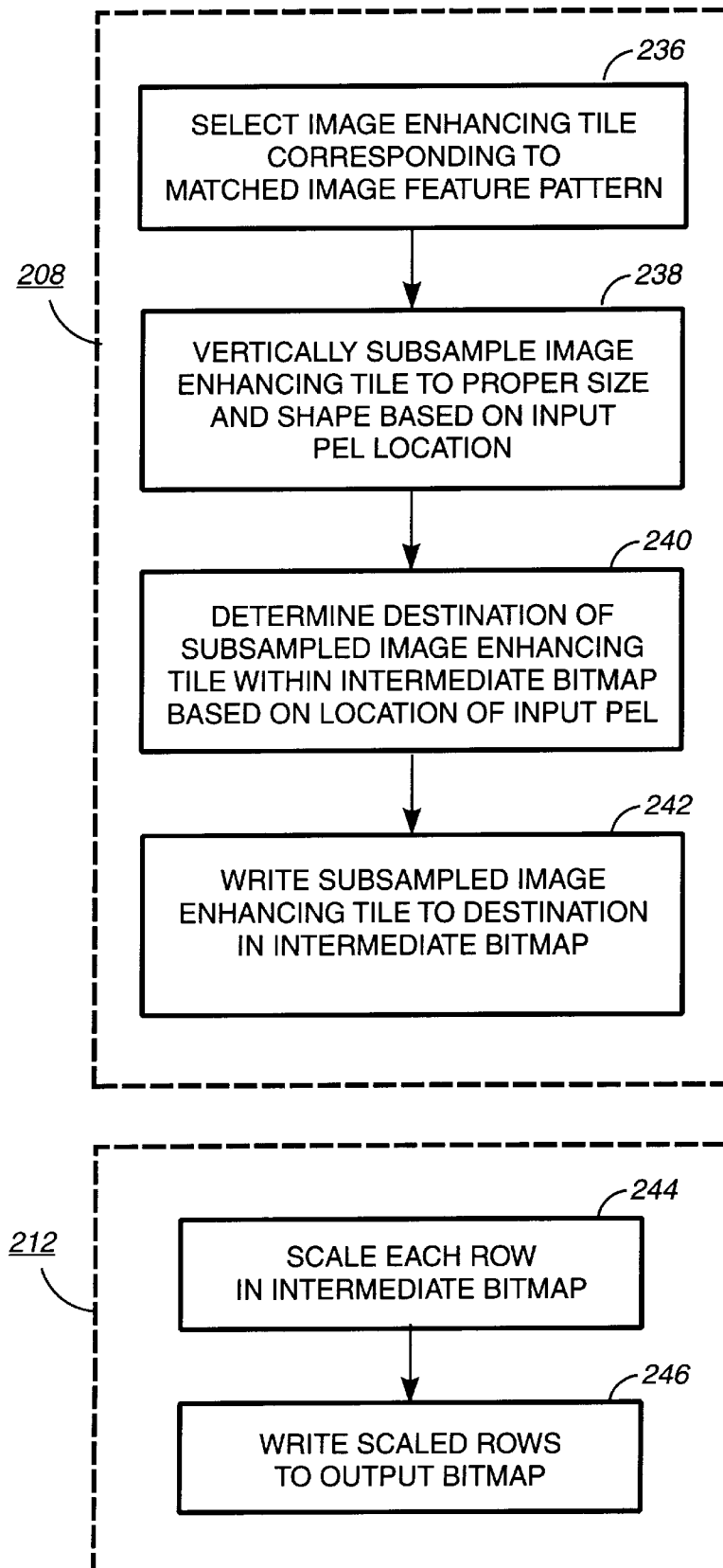
FIGURE 9. DETAIL OF FIG 4.

NON-INTEGER SCALING OF RASTER IMAGES WITH IMAGE QUALITY ENHANCEMENT USING AN ANAMORPHICALLY SCALED INTERMEDIATE BITMAP

CROSS REFERENCE TO RELATED APPLICATIONS

This application relates to technology similar to that in U.S. patent application Ser. Nos. 08/998,490 and 08/998,545, which were filed concurrently herewith and are assigned to the same entity.

BACKGROUND OF THE INVENTION

The present invention relates to printers and more specifically to a system and method for operating a printer with non-integer scaling of raster images with print quality enhancement.

Images representing font characters are stored in what is known as bitmaps. As the name suggests, a bitmap is a mapping of ones and zeroes which indicates the color values that individual picture elements or "pels" within an image will have when displayed by an output device. For example, a value of "1" within a bitmap may indicate that a corresponding picture element will have a color value of black when the image is printed on a black and white printer. A value of "0" may indicate that a corresponding picture element has a color value of white when the image is printed. Some users of printers have print jobs with old font resources, wherein the resolution is, for example, 240 pels per inch. New printers have resolutions of 600 pels per inch. Thus, there is a need for a method of scaling images with a resolution of 240 pels per inch to a resolution of 600 pels per inch with image quality enhancement. This problem is not limited to the precise resolutions mentioned herein, it occurs continually as printer image resolution improves.

A method for enhancement based on matches of image features is described in U.S. Pat. No. 4,437,122, which is incorporated by reference. This patent relates generally to pattern matching. This patent describes a method of enhancing the resolution and quality of characters. The method involves identifying patterns or "neighbor fields" surrounding selected pels within an input set of pels and enhancing the selected pels based on the features of the surrounding "neighbor field." The process results in a character whose resolution has been increased by a factor of three and whose diagonal and curved strokes have been smoothed.

Another patent in the area is U.S. Pat. No. 5,387,985 which is also incorporated by reference. This patent relates to the use of a plurality of lookup tables wherein each lookup table represents a unique phase relationship between the input and output bitmaps and to the use an intermediate bitmap with a resolution that is a common multiple of the input and output resolutions to effect non-integer resolution conversion.

However, the prior art is believed to lack the flexibility required for solving the problems of users of printers who have print jobs with old font resources and require non-integer scaling of font characters with quality enhancement.

SUMMARY OF THE INVENTION

Briefly, in accordance with the invention, a method for scaling a binary image from an input bitmap with lower resolution to an output bitmap with higher resolution and improved image quality includes the steps of: selecting a pel in the input bitmap; selecting a neighborhood centered around the selected pel; comparing the selected neighborhood with a set of preselected image feature patterns representing typical image features; and when the selected neighborhood matches an image feature pattern, writing an appropriate block of bits to an anamorphically scaled intermediate bitmap. That is a bitmap whose resolution in a first direction (e.g., row direction) is different from its resolution in a second direction perpendicular to the first direction (e.g., column direction). The destination of the block within the intermediate bitmap is determined by the location of the selected pel within the input bitmap. The size and shape of the block also depend upon the location of the selected pel within the input bitmap.

The block of bits is obtained by subsampling an image enhancing tile which corresponds to the matched image feature pattern. Subsampling is the process of determining a size and shape for an image enhancing tile based on the location of the corresponding pel in the input bitmap. The process of matching neighborhoods and writing a subsampled image enhancing tile (i.e., block of bits) to the intermediate bitmap is repeated for each pel in the input bitmap. When the image enhancing tiles are subsampled to the proper size and shape and placed in the proper locations in the intermediate bitmap, the jagged "stair-step" look of curved and diagonal image features in the input image is smoothed. The rows of the intermediate bitmap are then scaled down to the desired output resolution. The quality of output images obtained using this method is generally much higher than that obtained by methods which scale up to a desired resolution by simply replicating pels within the input bitmap.

BRIEF DESCRIPTION OF THE DRAWING(S)

FIG. 2 is a flow chart illustrating an image quality enhancement method wherein an intermediate bitmap is not used.

FIG. 3 is a flow chart showing an enhancement of the spatial enhancement method of FIG. 2.

FIG. 4 is a flow chart illustrating an image quality enhancement method wherein an intermediate bitmap is used.

FIG. 5 is a flow chart showing an enhancement of the image quality enhancement method of FIG. 4.

FIG. 6 is a flow chart showing another enhancement of the image quality enhancement method of FIG. 4.

FIGS. 8A, 8B, and 8C show the improvement in quality obtained using the method of the preferred embodiment.

FIG. 9 is a flow chart showing an enhancement of the image quality enhancement method of FIG. 4.

DESCRIPTION OF THE ILLUSTRATIVE EMBODIMENT(S)

Figure 1:
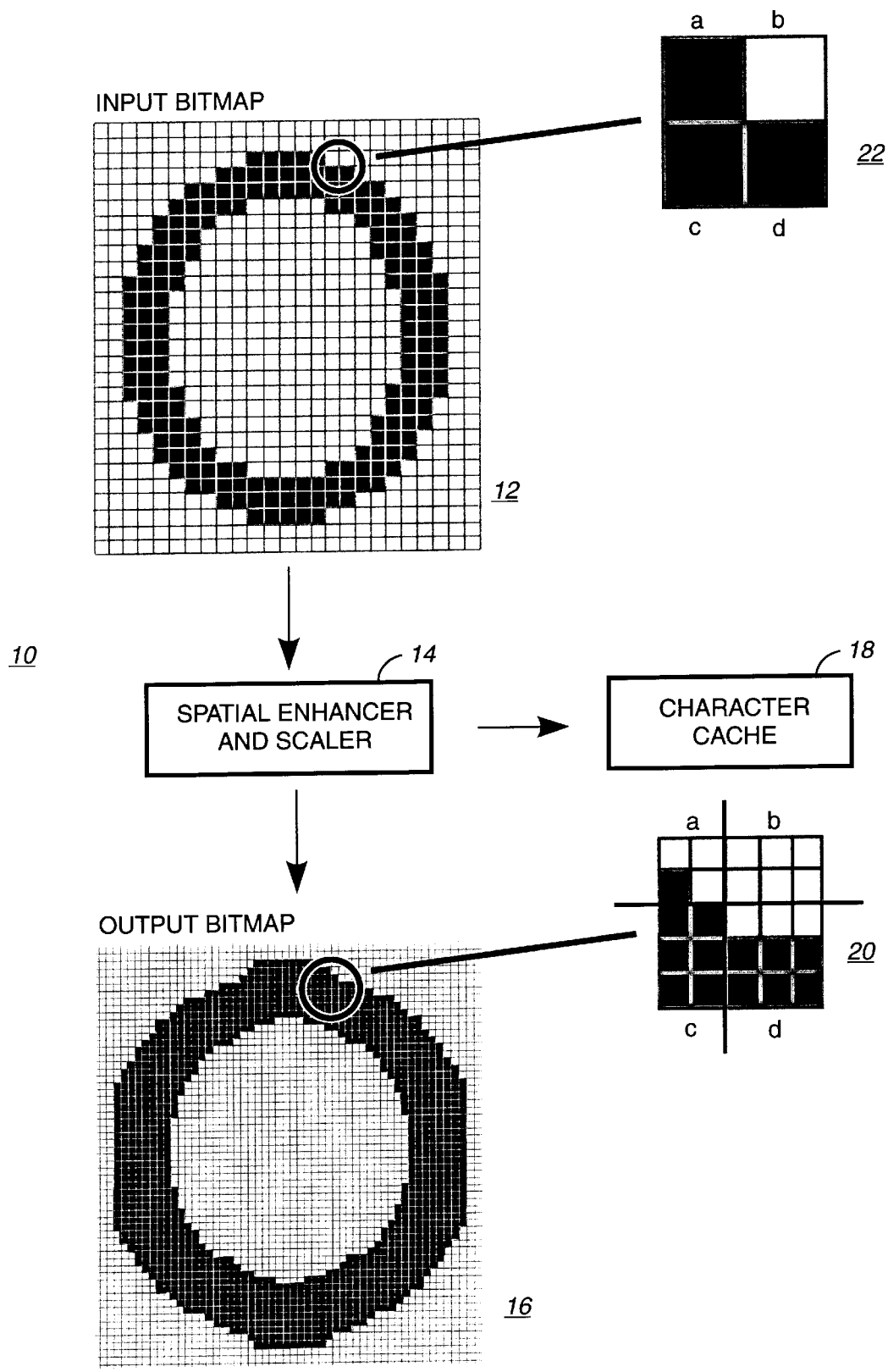
FIG. 1 is a block diagram of a scaling system including spatial enhancement functionality.

Referring to FIG. 1, there is shown a scaling system 10 in accordance with the invention. Scaling is the process of enlarging or reducing all or part of a display image by establishing a mapping from the set of bits (bitmap) which represents the input image to a larger or smaller set of bits which represents the enlarged or reduced image. In accordance with the invention an input bitmap 12 is processed by a spatial enhancer and scaler 14 to provide an output bitmap 16 with enhanced resolution. To effect image enhancement, some bits within the input map will map to collections of bits in the output bitmap whose elements have values different from the original bits. For example, in FIG. 1, the 2×2 block of bits 22 within the input bitmap (22) maps to the 5×5 block of bits (20) in the output bitmap. The spatial enhancer and scaler 14 implements a method for scaling and enhancing a binary image by a non-integer factor wherein a neighborhood is selected for each pel in the input bitmap. The spatial enhancer and scaler 14 may be implemented with software described herein loaded in printing apparatus, may be resident on ROM, may be a hardwired circuit or a combination of these (possibly located within a printer). Moreover, the functionality required for using the invention may be embodied in computer-readable media (such as 3.5 inch diskettes) to be used in programming an information-processing apparatus (e.g., a printer or computer controlling a printer) to perform in accordance with the invention. The resulting output bitmap 16 may be stored in any suitable cache memory 18 for possible fast reuse. As an example, if the spatial enhancer generates data to be used for the purpose of driving a display device with 600 pels per inch resolution and the resolution of the input bitmap is 240 pels per inch, the spatial enhancer may transform the 240 pel input bitmap into an intermediate bitmap whose rows have a resolution of 1200 pels per inch and whose resolution in the column direction is 600 pels per inch. The rows of the intermediate bitmap may then be scaled to 600 pels per inch to create an output bitmap with enhanced resolution and image quality.

Referring to FIG. 2, there is shown a flow chart illustrating an image enhancement method 100 wherein an intermediate bitmap is not used to produce the output bitmap. In step 104, a pel is selected in the input bitmap. Then a neighborhood is selected (step 106) surrounding the selected pel. A search is then performed (step 108), in a given storage location or locations to find an image feature pattern matching the pattern of the selected neighborhood. Once a match is found the corresponding bit pattern of proper size and shape is written (step 110) to an output bitmap. A decision 112 is then made on whether there are any additional pels to be checked in the input bitmap. If there are, the process returns to step 104 and the process continues to fill the output bitmap. If there are not, the process is done.

Referring to FIG. 3, there are shown steps expanding on step 110 of method 100 shown in FIG. 2. Thus, in accordance with this method, step 110 of method 100 (illustrated in FIG. 2) further comprises the steps of selecting (step 114) an image enhancing tile corresponding to the matched image feature pattern to be written to the output bitmap; creating a subsampled image enhancing tile by subsampling (step 116) the image enhancing tile to proper size and shape based on the location of the selected input pel in the input bitmap; determining (step 118) a destination for the subsampled image enhancing tile within the output bitmap based on the location of the selected input pel; and writing (step 120) the subsampled image enhancing tile to the destination in the output bitmap.

Referring to FIG. 4, there is shown an image enhancement method 200 which uses an intermediate bitmap with a resolution that is greater than the desired output resolution but not a common multiple of the input and desired output resolutions. The method 200 comprises the steps of: selecting (step 202) a pel in the input bitmap; selecting (step 204) a neighborhood surrounding the selected pel; searching (step 206) a set of image feature patterns to find an image feature pattern that matches the selected neighborhood; writing (step 208) an appropriate pattern to an intermediate bitmap based on the match. A decision 210 is then made whether there are other pels to check in the input bitmap. If there are, the method returns to step 202 to continue building the output bitmap. If there are no more pels to process in the input bitmap, the method 200 proceeds to step 212, wherein the intermediate bitmap is scaled to an output bitmap with the desired resolution.

FIG. 5, illustrates an image enhancement method in which a single image enhancing tile corresponds to each image feature. Thus, in accordance with this method, step 208 of method 200 further comprises the steps of selecting (step 214) an image enhancing tile corresponding to the matched image feature pattern to be written to the intermediate bitmap; creating a subsampled image enhancing tile by subsampling (step 216) the image enhancing tile to proper size and shape based on the location of the selected input pel in the input bitmap; determining (step 218) a destination for the subsampled image enhancing tile within the intermediate bitmap and writing (step 220) the subsampled image enhancing tile to its destination in the intermediate bitmap. The process is repeated for each pel in the input bitmap, resulting in an intermediate bitmap which has been scaled and enhanced.

As an example of the method of scaling with image quality enhancement in which an intermediate bitmap is used, consider the case where the input bitmap is scaled by a factor of 5/4. For example, the input bitmap has a resolution of 240 pels per inch and an output bitmap having a resolution of 300 pels per inch with improved quality is sought. An intermediate bitmap with resolution of 600 pels per inch will be created and it will be scaled down to 300 pels per inch.

Figure 1A:
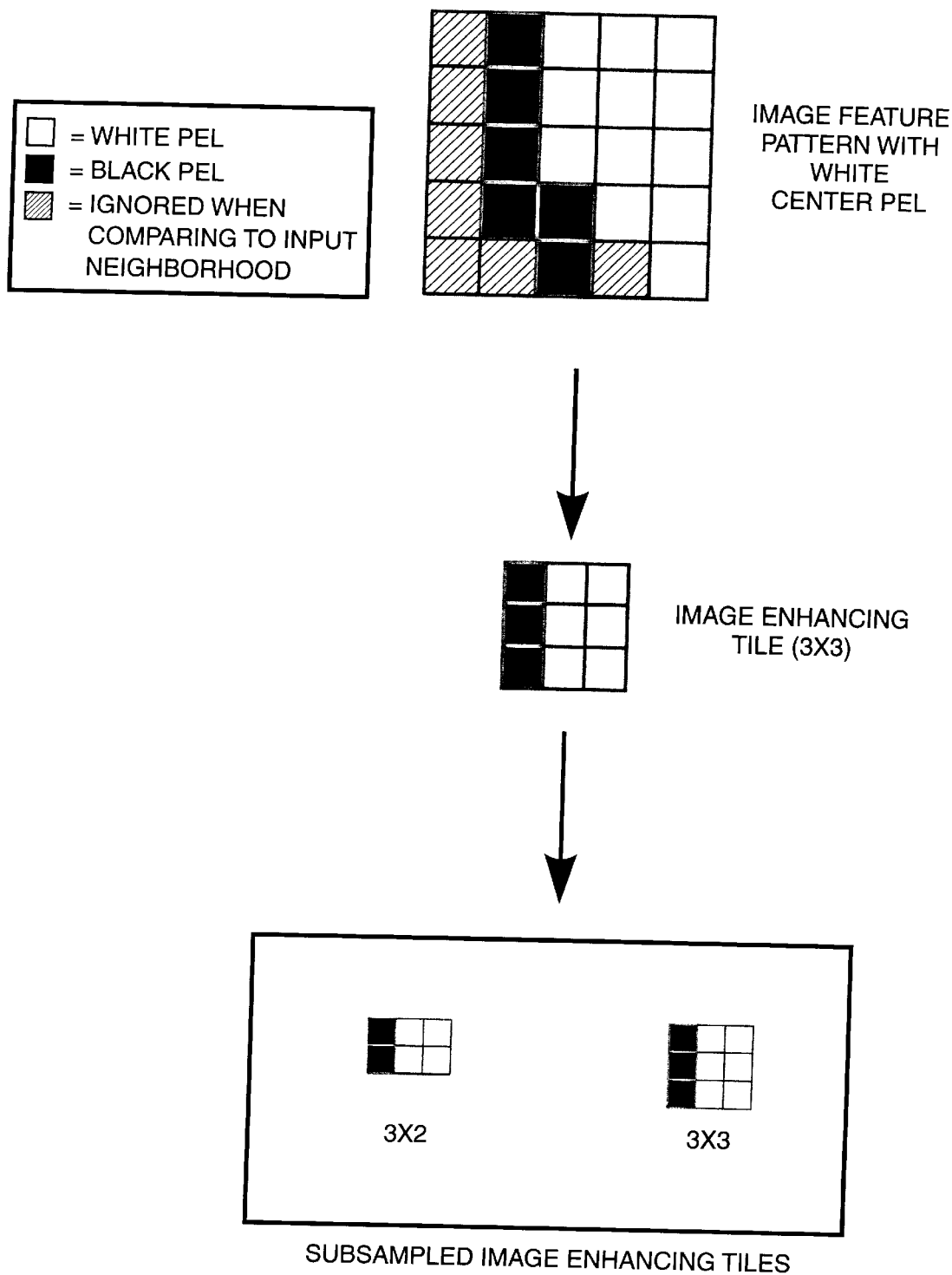
FIG. 1A shows an image feature pattern with a white center pel and its corresponding image enhancing tiles.
Figure 1B:
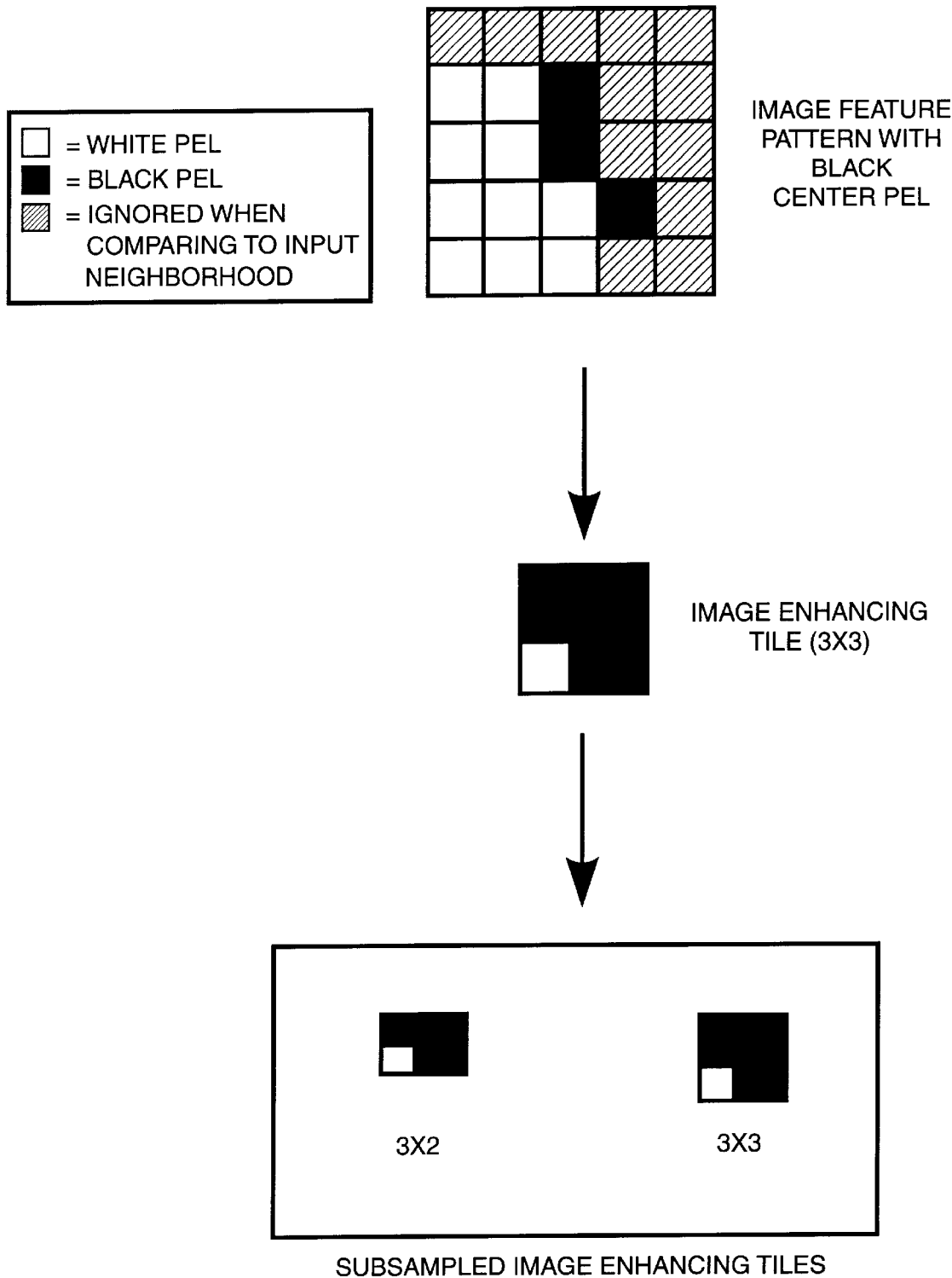
FIG. 1B shows an image feature pattern with a black center pel and its corresponding image enhancing tiles.

Referring to FIG. 1A, in accordance with the invention, a pel is selected in the input bitmap. Then a neighborhood is selected surrounding (centered about) the selected pel. In this example, the pel selected is white and the neighborhood is a 5×5 block of bits. The selected neighborhood is then compared with a set of 5×5 bit patterns (called image feature patterns) which represent typical image features (e.g., parts of character images). When the selected neighborhood matches an image feature pattern, an appropriately sized block of bits is then written to the proper location in the intermediate bitmap. Every neighborhood is guaranteed to match an image feature pattern since the set of image feature patterns includes two default image feature patterns—one for neighborhoods with white center pels (FIG. 1A) and one for neighborhoods with black center pels (FIG. 1B). If a selected neighborhood fails to match a non-default image feature pattern, it will match one of the default patterns. The image enhancing tiles corresponding to the default image feature patterns simply represent regions of various shapes which have the same color as the center pel within the input neighborhood.

The image enhancing tiles corresponding to non-default image feature patterns are chosen such that the coarser regions of diagonal and curved strokes in the input image are smoothed as the character is transformed into a higher resolution, i.e., as the process above is repeated for each pel in the input bitmap. These tiles may contain bits whose values are different from that of the center pel within the bitmap representing the selected neighborhood. (See FIG. 1A and FIG. 1B.) This reduces the "stair step" effect characteristic of raster images and improves the quality of the intermediate image. As the bits in the input bitmap are mapped into the intermediate bitmap, the location, size and shape of subsampled image enhancing tiles to be written to the intermediate bitmap are determined by the location of the selected pel within the input bitmap. As the selection and placement process described above is repeated for each pel in the input bitmap, the subsampled image enhancing tiles are tiled together and an intermediate bitmap is produced which has rows with a resolution that is greater than that of the desired output resolution. The output bitmap with enhanced resolution and improved quality is then created by scaling the rows of the intermediate bitmap as described below.

Referring to FIGS. 1A and 1B, there are shown two image feature patterns and their corresponding subsampled image enhancing tiles. In FIG. 1A, the center pel is white and in FIG. 1B, it is black. For each image feature pattern, one of two subsampled image enhancing tiles may be obtained. When a match between a neighborhood and an image feature pattern occurs, an image enhancing tile is selected. This tile is then subsampled based upon the location of the selected pel within the input bitmap to the proper size. In the embodiment described here, the image enhancing tiles are 3×3 bitmaps which are then subsampled to 3×2 bitmaps if required. (If a 3×3 tile is needed for the output, the 3×3 image enhancing tile is written direction to the output without subsampling.) The subsampled image enhancing tile is then written to the proper location in the intermediate bitmap. It is not necessary that the resolution of the image enhancing tiles be a common multiple of the input and intermediate resolutions. This process is repeated for all pels in the input. When completed, the process produces an intermediate image that is scaled and enhanced. To accomplish the smoothing, a white pel in the input or a black pel in the input may map to a region in the intermediate bitmap containing one or more white pels. The rows of the intermediate bitmap are then scaled down to create an output bitmap of the desired resolution and improved image quality.

In the preferred embodiment, the image feature patterns are stored in two arrays: one for image features with white center pels and one for image features with black center pels. Breaking up the set of image feature patterns in this fashion expedites the search for a match between the selected input neighborhood and an image feature pattern. An array is selected solely on the basis of the color value of the center pel within the selected input neighborhood and is not dependent upon a phase relationship between the input and output bitmaps. The elements of the array are of sufficient size to contain the bitmaps which represent the image features. When a neighborhood in the input bitmap is selected for comparison, certain bits may be ignored in the comparison. (FIG. 1A and FIG. 1B.) Therefore, each image feature pattern has a corresponding mask which is used to mask out bits in the selected neighborhood pattern which will be ignored. The masked input pattern is then compared to entries in one of the two image feature pattern arrays. When a match is found, a corresponding image enhancing tile is selected from an array whose elements are of sufficient size to contain the bitmaps which represent the image enhancing tiles. This image enhancing tile is then subsampled to the required size and shape based upon the location of the center pel of the input neighborhood within the input bitmap. The steps of subsampling the image enhancing tile and writing to the intermediate bitmap may be accomplished by obtaining a subset of rows from the image enhancing tile and oring the subset of rows into the proper storage destinations in the intermediate bitmap. In the preferred embodiment, the rows of the completed intermediate bitmap are then scaled using a method which scales runs of white and black pels to the desired output resolution.

Also, even though 3×3 image enhancing tiles are shown, the tiles may be of any size sufficient to create an intermediate bitmap with resolution greater than that of the desired output in the horizontal (row) direction. For example, the tiles could be 5×5 or 5×3 in size.

Referring to FIG. 6, there is shown additional detail for method 200 in which an intermediate bitmap is created which has a resolution that is greater than the output resolution but not necessarily a common multiple of the input and output resolutions in both directions. Thus, step 212 of method 200 further comprises the steps of scaling (Step 226) each row in the intermediate bitmap using a fast scaling technique which scales runs of white and black pels within the row; subsampling (step 228) the intermediate bitmap in the direction perpendicular to the rows (vertical direction) by removing a subset of the rows within the intermediate bitmap; and writing (step 230) the rows within the subset to the output bitmap.

The intermediate bitmap may also be scaled to the desired output resolution by ORing (step 232) (i.e., performing a logical OR operation) together collections of bits in the intermediate bitmap and writing (step 234) the results of the ORing process to the appropriate destinations in the output bitmap. The collections of bits in the intermediate bitmap may be organized into word sized vectors of bits so that the ORing process can efficiently operate on collections of words in the intermediate bitmap rather than on collections of single bits.

As an example, the input bitmap has a resolution of 240 pels, the intermediate bitmap has a resolution of 600 pels—2.5 times the input resolution and the output bitmap has resolution of 300 pels—one-half (½) the resolution of the intermediate bitmap. The resolution of the intermediate bitmap is not a common multiple of the input and output resolutions.

Although the preferred embodiment implements a scaling with enhancement by a factor of 5/4, the methods discussed herein may easily be extended to scaling by other factors.

Figure 7:
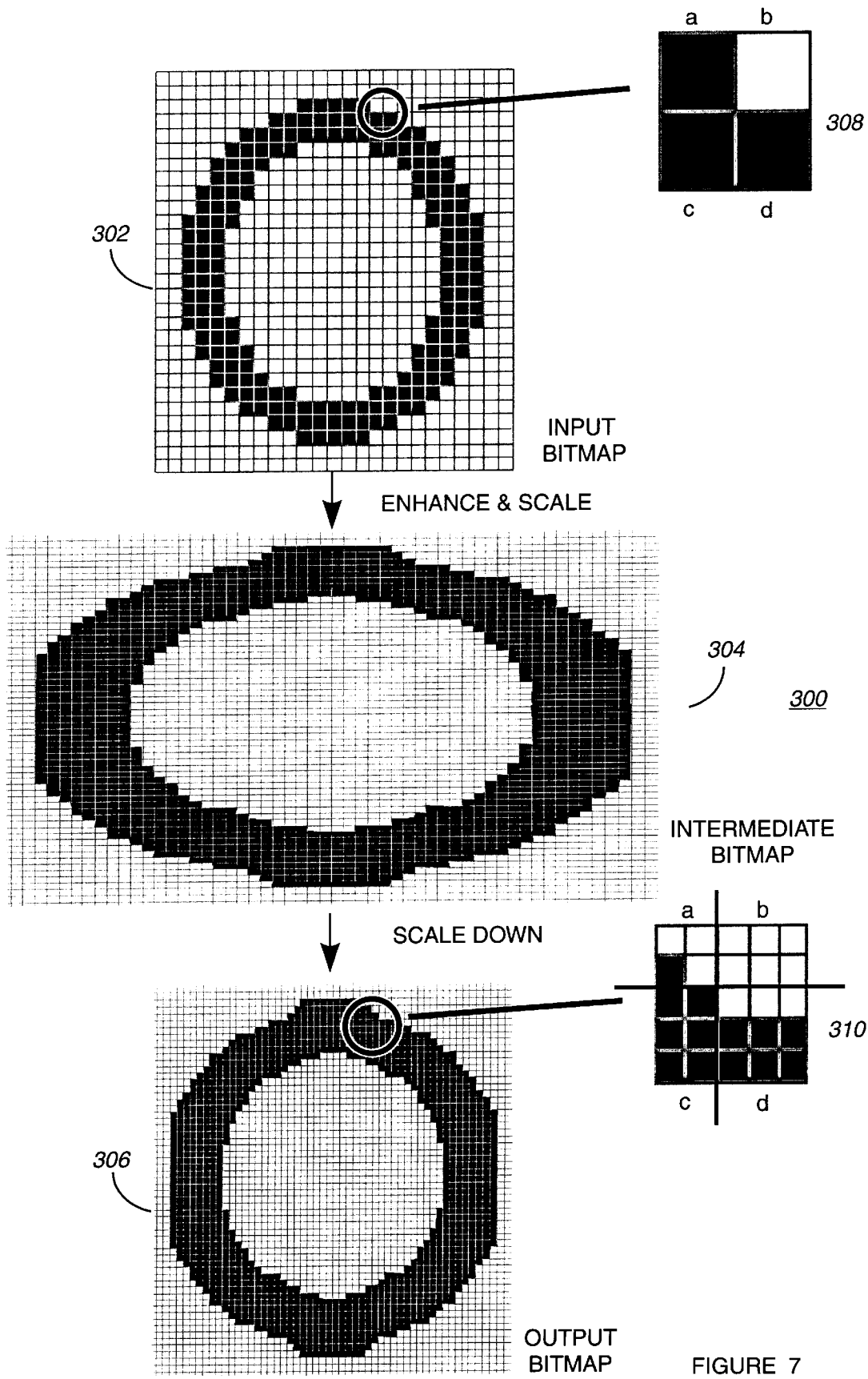
FIG. 7 illustrates the enhancement of an input bitmap using an intermediate bitmap.

FIG. 7 illustrates the enhancement of an input bitmap in accordance with the invention using an anmorphically scaled intermediate bitmap (a bitmap having different resolutions in its horizontal (row) and vertical (column) directions. The input bitmap is transformed into the intermediate bitmap as previously described. The rows of the intermediate bitmap are then scaled to the desired output resolution using a method which scales runs of white and black pels down by a factor of 2.

FIGS. 8A, 8B, and 8C show the improvement in quality obtained using the method of the preferred embodiment. FIGS. 8B and 8C show the bitmap of FIG. 8A scaled by a factor of 5/2 using two different scaling techniques. The bitmap of FIG. 8B is scaled using a simple technique which effectively duplicates each odd pel in a row and replicates each even row three times. The bitmap in FIG. 8C is scaled using the method implemented within the preferred embodiment. The curved part of the character "O" within this image is considerably smoother than that shown in FIG. 8B. They are also typically as smooth or smoother than the curve in the bitmap of FIG. 8A. Thus, the image is scaled with image quality enhancement.

Referring to FIG. 9, in accordance with the invention, there are shown additional steps expanding on steps 208 and 212 of method 200 shown in FIG. 2, in which the intermediate bitmap has rows with resolution (horizontal resolution) that is greater than the desired output resolution. The resolution of the intermediate bitmap in the direction perpendicular to the rows (vertical resolution) is equal to the desired output resolution. The intermediate bitmap is created by placing image enhancing tiles which have been subsampled by eliminating a subset of rows within the tile into the intermediate bitmap. Once the intermediate bitmap is completed, the rows are scaled to the desired output resolution through a method which scales white and black runs within the row.

Thus, step 208 of method 200 further comprises the steps of selecting (step 236) an image enhancing tile corresponding to a matched image feature pattern; vertically subsampling (step 238) the image enhancing tile by eliminating a subset of rows within the tile; determining (step 240) the destination of the subsampled image enhancing tile within the intermediate bitmap; and writing (step 242) the subsampled image enhancing tile to the desired location in the intermediate bitmap. Which rows are eliminated in the image enhancing tile and its destination in the intermediate bitmap depend on the location of the selected input pel within the input bitmap.

Step 212 further comprises the steps of scaling (step 244) each row in the intermediate bitmap to the desired resolution using a fast method that scales white and black runs within the row; and writing (step 246) the scaled rows to their proper locations in the output bitmap.

These methods may be implemented in software (e.g., in C or assembler language) that can be loaded into any programmable information handling apparatus that controls a printing process and may find applicability in systems having graphical displays. They may also be useful in the enhancement to other resolution transformations.

The foregoing is merely illustrative of the principles of the invention. Those skilled in the art will be able to depart from the disclosed embodiment and device alternate embodiments, nevertheless embodying the principles of the claimed invention.

What is claimed is:

1. A method for scaling an input bitmap to an output bitmap, having increased resolution and image quality enhancement, comprising the steps of:

selecting a pel in the input bitmap;

selecting a neighborhood surrounding the selected pel;

searching a set of image feature patterns to find an image feature pattern that matches the selected neighborhood;

writing an appropriate block of bits, based on the matching image feature pattern, to an anamorphically scaled intermediate bitmap whose resolution in a first direction is different than its resolution in a second direction perpendicular to the first direction, the resolution of the intermediate bitmap in the first direction being greater than a desired output resolution in the first direction and the resolution of the intermediate bitmap in the second direction being equal to the desired output resolution in the second direction; and scaling the rows of the intermediate bitmap to the desired output resolution.

2. The method of claim 1 wherein the step of writing an appropriate block of bits comprises:

selecting an image enhancing tile, corresponding to the matched image feature pattern, to be written to the intermediate bitmap;

subsampling the image enhancing tile to make it a proper size and shape based on the location of the selected pel in the input bitmap;

determining a destination for the subsampled image enhancing tile within the intermediate bitmap based on the location of the selected pel in the input bitmap; and writing the subsampled image enhancing tile to the determined destination in the intermediate bitmap.

3. The method of claim 1 wherein the input bitmap represents a font character and the output bitmap represents a resolution increased version of the font character with image quality enhancement.

4. The method of claim 1 further comprising the step of storing the output bitmap in a cache.

5. The method of claim 1 wherein the scaling of rows is accomplished by scaling all runs of white pels and of black pels within the rows of the intermediate bitmap.

6. The method of claim 1 further comprising the step of repeating each step of claim 1 for each pel within the input bitmap.

7. The method of claim 1 wherein the intermediate bitmap has a resolution in a first direction that is not a common multiple of the resolution of the input and output bitmaps and has a resolution in a second direction, perpendicular to the first direction, that is equal to that of the desired output resolution.

8. The method of claim 2 wherein the subsampling step comprises selecting a subset of rows within the image enhancing tile and writing it to the intermediate bitmap.

9. The method of claim 1 wherein the intermediate bitmap has a resolution in a first direction that is not a common multiple of the resolution of the input and output bitmaps and has a resolution in a second direction, perpendicular to the first direction, that is greater than that of the desired output resolution.

10. The method of claim 1 wherein the intermediate bitmap has a resolution in a first direction that is a common multiple of the resolution of the input and output bitmaps and has a resolution in a second direction, perpendicular to the first direction, that is equal to that of the desired output resolution.

11. The method of claim 1 wherein the intermediate bitmap has a resolution in a first direction that is five times that of the input bitmap and twice that of the desired output resolution in a second direction perpendicular to the first direction whcih is equal to that of the desired output resolution.

12. A computer-readable storage medium including program instructions for scaling an input bitmap having a first resolution to an output bitmap having increased resolution, comprising instructions for:

selecting a pel in the input bitmap;

selecting a neighborhood surrounding the selected pel;

searching a set of image feature patterns to find an image feature pattern that matches the selected neighborhood;

writing an appropriate block of bits, based on the matching image feature pattern, to an anamorphically scaled intermediate bitmap whose resolution in a first direction is different than its resolution in a second direction perpendicular to the first direction, the resolution of the intermediate bitmap in the first direction being greater than a desired output resolution in the first direction and the resolution of the intermediate bitmap in the second direction being equal to the desired output resolution in the second direction; and scaling the rows of the intermediate bitmap to the desired output resolution.

13. The computer-readable storage medium of claim 12, wherein the instruction for writing an appropriate block of bits comprises instructions for:

selecting an image enhancing tile, corresponding to the matched image feature pattern, to be written to the intermediate bitmap;

subsampling the image enhancing tile to make it a proper size and shape based on the location of the selected pel in the input bitmap;

determining a destination for the subsampled image enhancing tile within the intermediate bitmap based on the location of the selected pel in the input bitmap; and writing the subsampled image enhancing tile to the determined destination in the intermediate bitmap.

14. The computer-readable storage medium of claim 12 wherein the input bitmap represents a font character and the output bitmap represents a resolution increased version of the font character with image quality enhancement.

15. The computer-readable storage medium of claim 12 further comprising an instruction for storing the output bitmap in a cache.

16. The computer-readable storage medium of claim 12 wherein the scaling of rows is accomplished by scaling all runs of white pels and of black pels within the rows of the intermediate bitmap.

17. The computer-readable storage medium of claim 12 further comprising the instruction of repeating each step of claim 12 for each pel within the input bitmap.

18. The computer-readable storage medium of claim 12 wherein the intermediate bitmap has a resolution in a first direction that is not a common multiple of the resolution of the input and output bitmaps and has a resolution in a second direction, perpendicular to the first direction, that is equal to that of the desired output resolution.

19. The computer-readable storage medium of claim 12 wherein the subsampling step comprises selecting a subset of rows within the image enhancing tile and writing it to the intermediate bitmap.

20. An information handling system comprising:

a memory for storing an input bitmap and an output bitmap;

means for selecting a pel in the input bitmap;

means for selecting a neighborhood surrounding the selected pel;

means for searching a set of image feature patterns to find an image feature pattern that matches the selected neighborhood;

means for writing an appropriate block of bits, based on the matching image feature pattern, to an anamorphically scaled intermediate bitmap whose resolution in a first direction is different than its resolution in a second direction perpendicular to the first direction, the resolution of the intermediate bitmap in the first direction being greater than a desired output resolution in the first direction; and means for scaling the rows of the intermediate bitmap to the desired output resolution.

21. The information handling system of claim 20 further comprising;

means for selecting an image enhancing tile, corresponding to the matched image feature pattern, to be written to the intermediate bitmap;

means for subsampling the image enhancing tile to make it a proper size and shape based on the location of the selected pel in the input bitmap;

means for determining a destination for the subsampled image enhancing tile within the intermediate bitmap based on the location of the selected pel in the input bitmap;

means for writing the subsampled image enhancing tile to the determined destination in the intermediate bitmap; and a cache for storing the output bitmap.

* * * * *